United States Patent
Subramanian et al.

(10) Patent No.: US 11,314,627 B2
(45) Date of Patent: Apr. 26, 2022

(54) TEST AUTOMATION SYSTEM FOR DISTRIBUTED HETEROGENOUS ENVIRONMENTS

(71) Applicant: SAP SE, Walldorf (DE)

(72) Inventors: Srininvasan Subramanian, Bangalore (IN); Nivedita Jain, Bangalore (IN); Prasanth Rj, Bangalore (IN); Saravanan Seenivasan, Kovilpatti (IN); Ganeshkumar Venugopalan, Bangalore (IN); Gundala Rakesh Kumar Reddy, Bangalore (IN)

(73) Assignee: SAP SE, Walldorf (DE)

( * ) Notice: Subject to any disclaimer, the term of this patent is extended or adjusted under 35 U.S.C. 154(b) by 539 days.

(21) Appl. No.: 15/958,521

(22) Filed: Apr. 20, 2018

(65) Prior Publication Data
US 2019/0324897 A1    Oct. 24, 2019

(51) Int. Cl.
*G06F 11/36* (2006.01)

(52) U.S. Cl.
CPC ...... *G06F 11/3684* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 6,408,335 B1* | 6/2002 | Schwaller | ............... | H04L 43/50 703/13 |
| 8,799,714 B1* | 8/2014 | Guruswamy | ....... | G06F 11/3684 714/32 |
| 8,904,346 B1* | 12/2014 | Strikhalev | ........... | G06F 11/3688 717/108 |
| 9,912,573 B1* | 3/2018 | Zemlerub | ........... | H04L 41/5038 |
| 9,978,084 B1* | 5/2018 | Sharma | ............... | G06Q 30/0269 |
| 2008/0086348 A1* | 4/2008 | Rao | ..................... | G06F 11/3684 705/7.11 |
| 2008/0086499 A1* | 4/2008 | Wefers | .................... | G06Q 10/10 |
| 2008/0228861 A1* | 9/2008 | Tadauchi | ............... | G06Q 10/10 709/203 |

(Continued)

OTHER PUBLICATIONS

Cappiello et al., A UI-Centric Approach for the End-User Development of Multidevice Mashups, 40 pages (Year: 2015).*

*Primary Examiner* — Philip Wang
(74) *Attorney, Agent, or Firm* — Buckley, Maschoff & Talwalkar LLC

(57) ABSTRACT

Automated testing is performed in a distributed environment having computer systems executing software based on heterogenous application stacks. The computer systems are connected via the network to a service platform. A method provides for executing a function directed to a target system of the computer systems, the function resulting in network requests being sent from the service platform to the target system. The method further includes recording, at the service platform, the network requests produced by the executed function. The method further includes generating a service corresponding to the function based on the recorded network requests. The method further includes executing a test scenario which uses the generated service corresponding to the function to produce test requests.

17 Claims, 11 Drawing Sheets

(56) References Cited

U.S. PATENT DOCUMENTS

| | | | |
|---|---|---|---|
| 2011/0231825 A1* | 9/2011 | Grechanik | G06F 11/3684 717/126 |
| 2013/0080570 A1* | 3/2013 | Anderson, Jr. | H04L 43/50 709/217 |
| 2014/0047410 A1* | 2/2014 | Muthukumar | G06F 11/3688 717/106 |
| 2014/0244766 A1* | 8/2014 | Mo | G06Q 50/01 709/206 |
| 2015/0339213 A1* | 11/2015 | Lee | G06F 3/0484 717/125 |
| 2020/0278920 A1* | 9/2020 | Khakare | G06F 9/45558 |

* cited by examiner

TEST AUTOMATION SYSTEM FOR DISTRIBUTED HETEROGENOUS ENVIRONMENTS

FIELD OF THE INVENTION

The disclosed embodiments are directed to a test automation system for distributed environments having computer systems with heterogeneous application stacks.

BACKGROUND

Enterprises and businesses are making ever increasing use of digital applications in distributed environments. Consequently, there is an emphasis on providing integration points for these applications to exchange information. Before collaboration links can be established, thereby providing use cases which cut across multiple applications to end users, there is a need for quality engineers versed in a multiplicity of diverse application stacks to perform thorough testing. In particular, the quality engineers must collaborate and certify the proper functioning of business scenarios on multiple independent application stacks which may be subject to inbound and outbound feature extensions during the course of such certification.

One challenge in creating scripts for automated testing to certify solutions in heterogenous application stack environments is diversity in release and deployment models, such as on-premise, pre-packed installations, hybrid clouds, private and public clouds, etc. Also, there are multiple architecture layers, such as user interface (UI), application program interface (API), database, and data pipelines which need to be considered in tandem with respect to functional and integration points to completely verify the system. Another challenge in creating test artifacts, i.e., automation scripts, to certify solutions in heterogenous application stack environments is diversity in underlying programming languages used in applications, such as C++, JAVA, ABAP, etc.

Conventional approaches to automation testing design are specific to application stack type and tightly coupled to developer code. There are limited tools and design approaches to validate cross-functional scenarios developed on heterogenous stacks in an automated fashion. Conventional solutions available to production customers may be closed for modification. Conventional solutions which are open for feature extensions via REST or SOAP API may require complicated architecture design for setting up a test environment for quality assurance certification.

SUMMARY

Disclosed embodiments provide test automation design, persistence, and processing for validating applications in distributed heterogeneous environments. In disclosed embodiments, a web-based interface is provided for modeling end-to-end test scenarios by selecting and associating predetermined visual elements with configurable runtime parameters.

Disclosed embodiments provide systems, methods, computer-readable media, and design processes for supporting test automation for complex application architectures with an emphasis on beta testing and end-to-end regression testing using automation. The operational of such platforms may be enabled by microservice architecture and distributed computing algorithms.

In disclosed embodiments, an automation service platform supports a design mode and runtime mode to support test scenario design and test execution. A design mode workbench allows users to intercept all requests between the user and an HTTP-supported webserver, and such requests can be further instrumented and processed for automated service generation. This can be achieved by a browser proxy server or HTTP proxy servers.

Disclosed embodiments allow instrumenting an application at HTTP protocol level with HTTP archive (HAR) recording/capture tools. Alternatively, there may be a proxy server at HTTP level, thereby intercepting communication between browser and server. In disclosed embodiments, the system uses an HTTP-based proxy server to record the TCP traffic flow and translate backend calls into a reusable microservice. Disclosed embodiments provide a protocol to extend functional validation elements to be exposed as a microservice dictionary which can be a REST-based WADL, SOAP-based WSDL, or an OData database metadata dictionary. The functional execution details and implementation can be zipped and provided as a packaged JAR or WAR if need to be run in cloud containers.

Disclosed embodiments provide service versioning, where the system maintains a version of service definition list, e.g., in WSDL or WADL format, for individual application release. The system may maintain the package and versioning system for test artifacts so it can be backward compatible. In disclosed embodiments, the system provides for quality assurance at different levels in the software stack, such as, for example, application program interface (API), database, and user interface (UI) level integrations. The system allows for different types of testing to be supported, such as, for example, unit, smoke, sanity, performance, regression, beta, and integration testing from heterogenous backend environments.

Disclosed embodiments provide a computer-implemented method for creating an automation service platform which can be used to validate application functional or non-functional behavior in heterogeneous application stacks. The abstracted test components may include functions from complex backend architectures, represented graphically in a user interface as blocks. The test components from applications under test with diverse application stacks, such as cloud, on-premise, and hybrid production environments may be implemented as microservices and graphically represented as blocks in a user interface of the automation service platform. Other test components, such as application program interface (API), module, or database-specific functional validations may be implemented as microservices and represented graphically as blocks in a user interface of the automation service platform.

Disclosed embodiments provide a computer-implemented method for executing a test scenario across multiple independent applications hosted on different webservers with heterogeneous backend stacks. For example, a first node representing API verifications from a first application and a second node representing UI verifications from a second application may be connected on a design canvas of a user interface to represent an integrated test flow for automation.

Disclosed embodiments provide a system including: an execution engine; a data bus coupled to a processor; and a storage medium embodying computer program code. The storage medium may be coupled to the data bus. The computer program code may interact with a number of computer operations and may include instructions executable by the processor and configured for expressing an abstracted test scenario flow as graphic blocks. The abstracted test scenario may be executed in a virtual test farm while de-coupling the abstracted test flow from the test data and the test environment.

In disclosed embodiments, the abstracted test scenario flow may include complex environment dependencies and validation computations. The abstracted test scenario flow may be partially executed in one test environment and may have a few steps executed in a different test environment, while maintaining test execution flow. Output responses from particular blocks within a specific test execution may determine runtime test execution flow. Output responses from particular blocks may be persisted in a runtime context to be given input data in subsequent blocks.

Disclosed embodiments may provide an authentication mechanism to handle multiple session and storage cookies to support multi-factor authentication and authorization for diverse independent applications from a central execution engine. A proxy server setup may intercept all incoming traffic between a user and server and may instrument stateless calls to be bundled as service and hosted as microservices for function reusability. A determination may be made as to whether particular request parameters and payloads are to be modified and stored for benchmarking.

In disclosed embodiments, the system may be tuned and configured to be used for non-functional testing, such as performance, single-user performance benchmarking, web security testing, database testing, user acceptance testing, regression testing, etc., with individual applications exposing underlying functions as computer-readable application program interfaces (APIs).

In one aspect, the disclosed embodiments are a method, and corresponding system, of performing automated testing in a distributed environment having heterogeneous application stacks. The environment has a number of computer systems interconnected via a network, each of the computer systems executing software based on an application stack. The computer systems are connected via the network to a service platform. The method includes executing a function directed to a target system of the computer systems, the function resulting in network requests being sent from the service platform to the target system. The method further includes recording, at the service platform, the network requests produced by the executed function. The method further includes generating a service corresponding to the function based on the recorded network requests. The method further includes executing a test scenario which uses the generated service corresponding to the function to produce test requests.

The disclosed embodiments may include one or more of the following features.

The generating of the service may include extracting network requests relating to the function from the recorded network requests. The generating may further include determining a flow mapping for the function, the flow mapping including a sequence of requests based on the extracted network requests. The generating may further include determining context parameters for the function based on the extracted network requests. The generating may further include creating a service definition based on the flow mapping and the context parameters. The context parameters may include at least one of cookie and session parameters. The flow mapping may include timing parameters for the sequence of requests. The service definitions may be stored in a registry. The test scenario may be created via a user interface which is configured to allow one or more functional elements, which correspond to service definitions stored in the registry, to be arranged to form the test scenario. The executing of the test scenario may include sending the test requests to a test environment comprising a plurality of virtual machines. The executing of the test scenario may include binding test input data to the functional elements. The network requests and the test requests may include HTTP requests.

DETAILED DESCRIPTION

Figure 1:
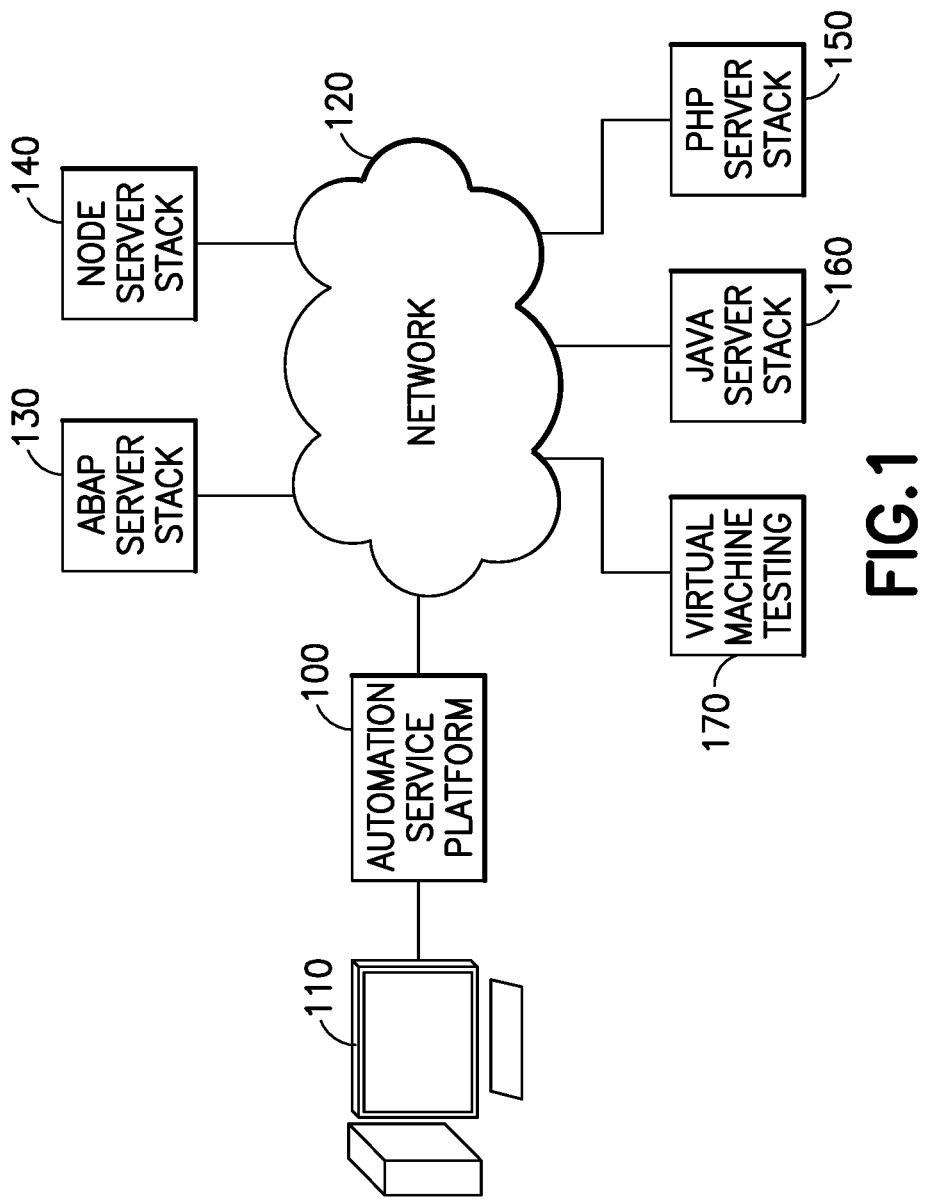
FIG. 1 is a block diagram of a test automation system for distributed environments having heterogeneous application stacks.

FIG. 1 is a block diagram of a test automation system for distributed environments having heterogeneous application stacks. An automation service platform 100, also referred to as a diverse stack service platform, may be implemented as a server, a computer system, and/or a computing environment. A user computer 110 is connected to the automation service platform 100 to provide a user interface for operating the platform. In disclosed embodiments, the automation service platform 100 is implemented in a distributed heterogenous environment, i.e., the platform is connected via a network 120 to a multiplicity of environments (e.g., back end servers/systems) which use a diversity of types of application stacks. For example, the platform 100 may be connected to an environment which uses an Advanced Business Application Programming (ABAP) server stack 130, an environment which uses a node server stack 140, an environment which uses a PHP server stack 150, and an environment which uses a JAVA server stack 160. The automation service platform 100 is also connected via the network 120 (or a separate network) to a virtual machine testing system 170. The platform may be connected to only the diverse sever stacks, the server stacks and the virtual machines, or only the virtual machines, depending upon the particular phase of testing being performed.

Figure 2:
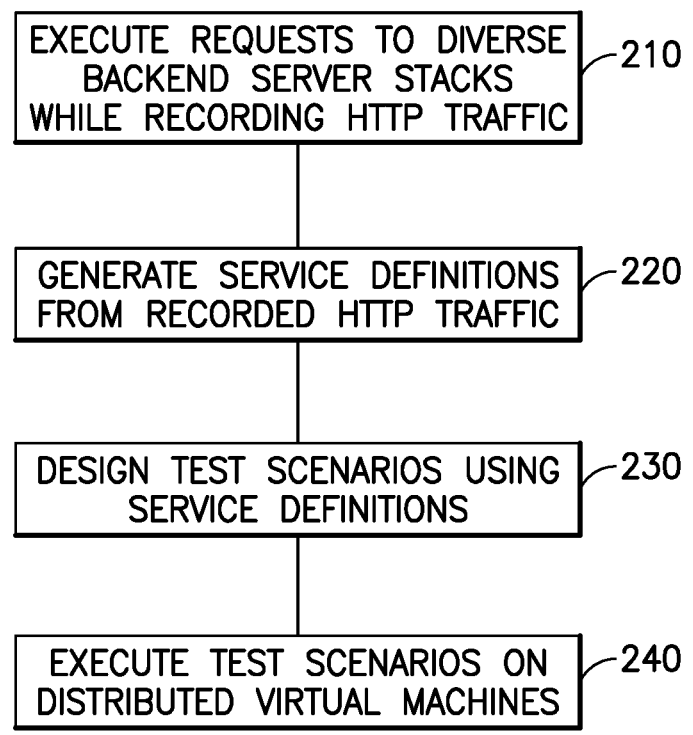
FIG. 2 is a flowchart for performing automated testing for distributed environments having heterogeneous application stacks.

FIG. 2 depicts a process for performing automated testing for distributed environments having heterogeneous application stacks, i.e., environments which use a diversity of types of application stacks. The steps depicted in FIG. 2 are discussed in general terms in the following few paragraphs and then are discussed in further detail in the context of the other figures presented herein.

The automation service platform 100, controlled by a user computer 110, executes determined functional scenarios, such as, for example, the computer operations performed when a new employee is hired (e.g., entry of employee personal data and payroll registration) (210). The requests generated by these functional scenarios are sent via the network to various environments (e.g., back end servers/systems) which use a diversity of types of application stacks, e.g., as shown in FIG. 1, and responses are received from these diverse back end systems. In disclosed embodiments, the requests sent and responses received in the form of internet protocol (IP) network traffic, e.g., HTTP requests, are recorded at the automation service platform 100. Because the requests and responses are in the form of network traffic, which is independent of the particular application stacks used to generate the traffic, the automation service platform is agnostic to the application stack types.

The automation service platform 100 generates service definitions, i.e., microservices, based on the recorded HTTP requests (220). These services are stored by the automation service platform and are used to translate functional elements into their corresponding network requests. The services thereby allow a testing application to communicate with the multiplicity of diverse backend systems without regard for the application stack type of each backend system.

A user can create various test scenarios using the service definitions (230). For example, the user may use a user interface to create sequences of operations which involve functional elements and responses with diverse backend systems (e.g., operations required to register a new employee in the payroll system). The service definitions are used to produce and interpret the network traffic associated with the sequences. In disclosed embodiments, the test scenarios are executed using a distributed array of virtual machines (240), as discussed in further detail below.

Figure 3:
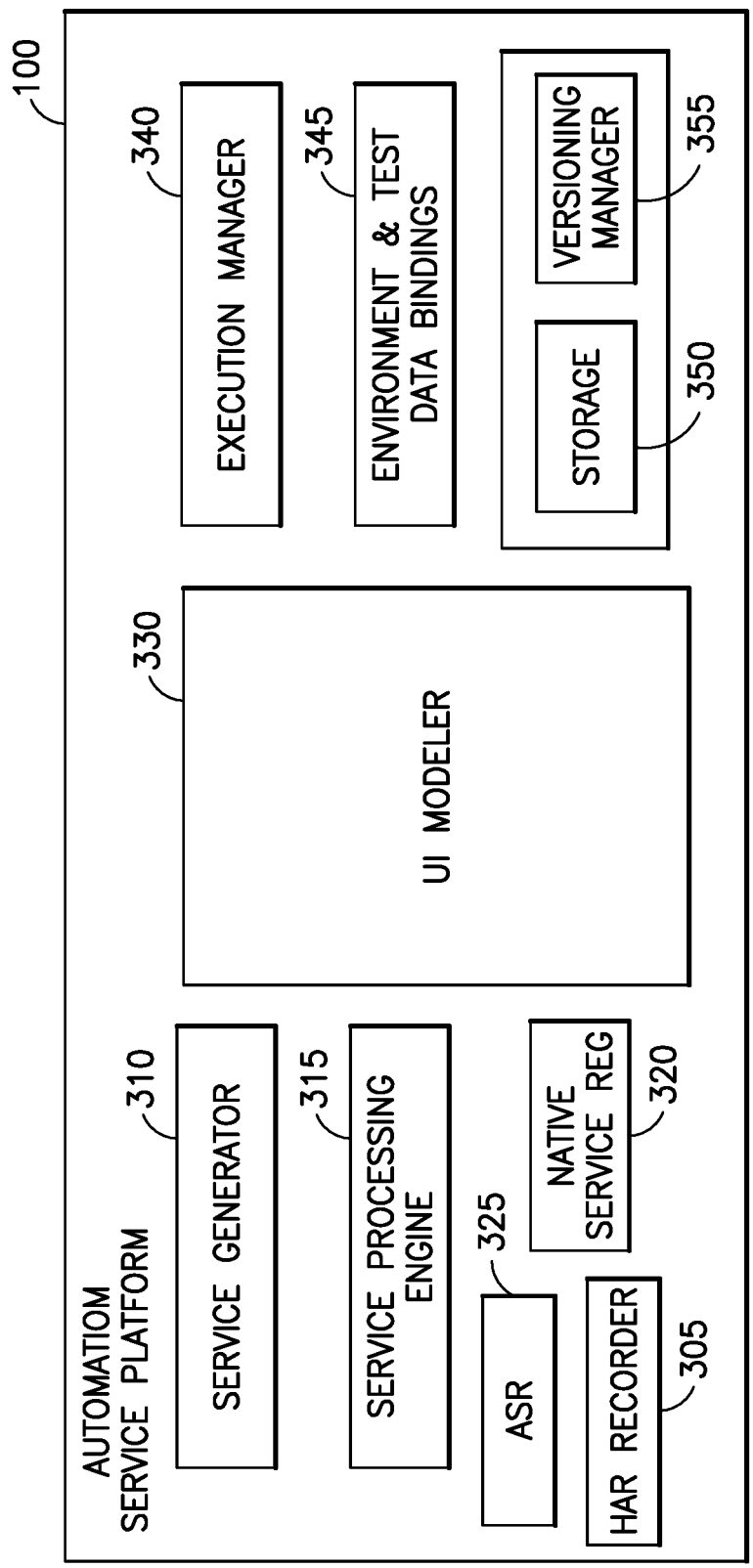
FIG. 3 is a block diagram of a diverse stack automation service platform.

FIG. 3 is a block diagram of a diverse stack automation service platform 100. The automation service platform 100 performs the functions discussed above with reference to FIG. 2. The automation service platform 100 executes functional elements which result in requests to diverse backend server stacks while recording HTTP traffic (FIG. 2, 210). The requests may be generated by the automation service platform itself, or may be received from a user computer (FIG. 1, 110) connected to the automation service platform, in the form of HTTP requests. The requests are sent via a network to backend systems with diverse application stack types and responses are received from the backend systems in the form of network traffic. The network traffic associated with the requests and responses is recorded by the automation service platform using an HTTP archive (HAR) recorder 305.

The automation service platform 100 generates service definitions from recorded HTTP traffic (FIG. 2, 220). The recorded traffic is used by a service generator 310, in conjunction with a service processing engine 315 and a native service registry 320, to produce service definitions. The service definitions are persisted (i.e., stored) in an application service registry (ASR) 325. The native service registry 320 supports testing services for unit and component testing layers which can be expressed as, e.g., REST, ODATA, SOAP, or any other API implementations. The native service registry also provides a predefined contract of service definition that can be accessed as WSDL, WADS or SOAP metadata which provides implementation detail for given application under test.

The automation service platform 100 provides a user interface (UI) modeler 330 to allow a user to design test scenarios based on the generated service definitions (230). As discussed in further detail below, the UI modeler 330 allows a user to create and modify sequences of functional elements to be executed as a test scenario. In disclosed embodiments, the created test scenarios are executed on distributed virtual machines (240). The testing is controlled by an execution manager 340 in conjunction with environment and test data bindings 345 which provide the necessary context for execution, e.g., the required input data for a particular functional element. The test execution functionality of the test platform 100 also includes storage 350 to facilitate analysis of failures and to maintain execution reports for a given version. There is also a versioning manager 355, which keeps track of product changes and any associated changes in test input data or other parameters.

In disclosed embodiments, automation service platform 100 can be implemented in an on-premises environment within an enterprise firewall network or it can be implemented in public or private cloud environments and hosted on web application servers to support horizontal and vertical scaling for larger loads.

The workflow scenarios of automation service platform 100 can be considered in two categories: design time flows and run time flows. In a design time flow, the user interaction may include discovery and configuration of independent functional scenarios in the service generator 310 and creation of an end-to-end test scenario design using the user interface (UI) modeler 330 by dragging and dropping available functional services to generate metadata independent of test data and environment configuration. Test scenario flow metadata can be configured with multiple input datasets and environment configurations at runtime which are handled by the execution manager 340. In disclosed embodiments, there is a logical mapping of test scenario flow to a high level test suite which allows broader classification and segregation of test flows. Functional users may also be given options to download and upload files in formats such as XML and CSV flat files. Test scenario flow metadata may be serialized and stored to various computer-readable data sources for persistence, including, e.g., databases, NoSQL, flash memory, CD ROM and tapes. Stored test scenarios may be reconstructed on a design canvas on demand.

Figure 4:
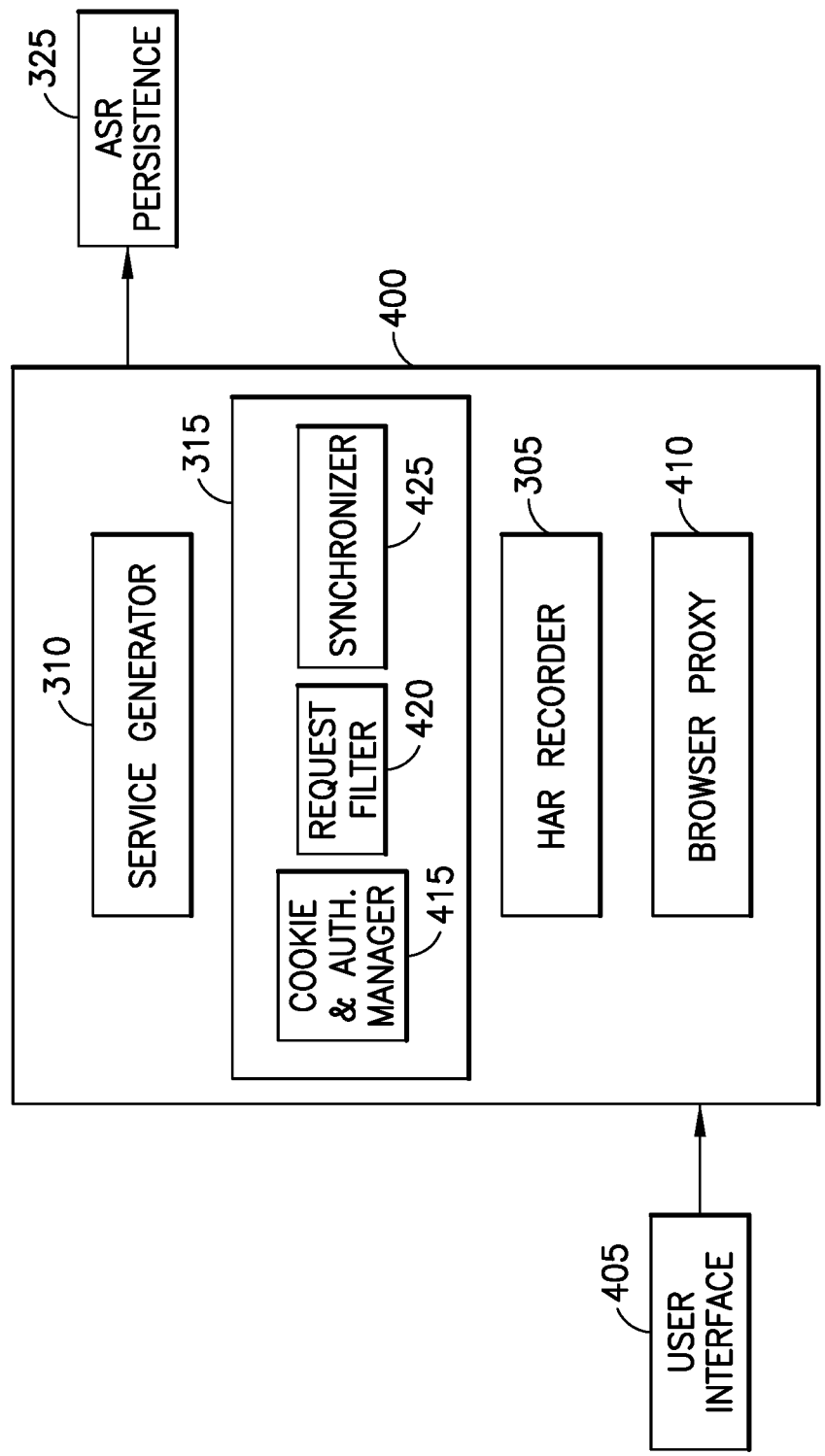
FIG. 4 is a block diagram of a subsystem for performing service generation in the automation service platform of FIG. 3.

FIG. 4 is a block diagram of a subsystem 400 for performing service generation in the diverse stack automation service platform 100. The subsystem 400 may be incorporated into the automation service platform 100 itself or may be implemented as a distinct system. A user interface 405 is provided, such as a user computer (FIG. 1, 110), which interacts with a browser proxy 410. Functional elements are initiated by the user at the user computer, which functions, in effect, as a terminal for accessing the browser proxy 410 in the service generation subsystem 400. Network traffic (e.g., HTTP requests) corresponding to the functional elements is produced by the browser proxy 410. Alternatively, the user computer may provide a browser which produces network traffic corresponding to the functional elements and sends the network traffic to the service generation subsystem 400.

The HTTP requests associated with the functional elements are recorded by the HAR recorder 305. The service generator 310, in conjunction with the service processing engine 315, generates functional services based on the recorded HTTP requests. In disclosed embodiments, the HTTP requests recorded by the HAR recorder are aggregated and sent to service processing engine 315 for further instrumentation. For example, service processing engine 315 may perform sequencing of the requests based on user interest selection and/or filtering of the requests based on request types. The service processing engine 315 also provides a mechanism for altering and mocking recorded requests with cookie data, input data, and/or request headers.

Upon creating a successful functional scenario, the requests processed in the service processing engine 315 are sent to the service generator 310 to persist them in the ASR persistence 325 of the automation service platform 100. The service generator may save a listing (i.e., contents) of functional elements with version management and make this available to users for test scenario design. In disclosed embodiments, the service generator 310 provides metrics and intelligence to suggest existing services with a determined degree of similarity during the test scenario design phase. It may also persist benchmark metrics from the requests recorded by the HAR, such as page load time, request load time, page size, and cookie information.

The service processing engine 315 includes a cookie and authentication manager 415, a request filter 420, and a synchronizer 425. The cookie and authentication manager 415 maintains application-specific cookie and session details required for authentication and authorization. In a HAR-recorded file there could be unnecessary HTTP traffic which is not of use to the system (e.g., cascading style sheet, JavaScript, etc.). The request filter 420 functions to remove such unnecessary traffic. The synchronizer 425 is used in queuing HTTP requests in an ordered manner and allows for the introduction of delay time. The functions of these components are discussed in further detail below.

Figure 5:
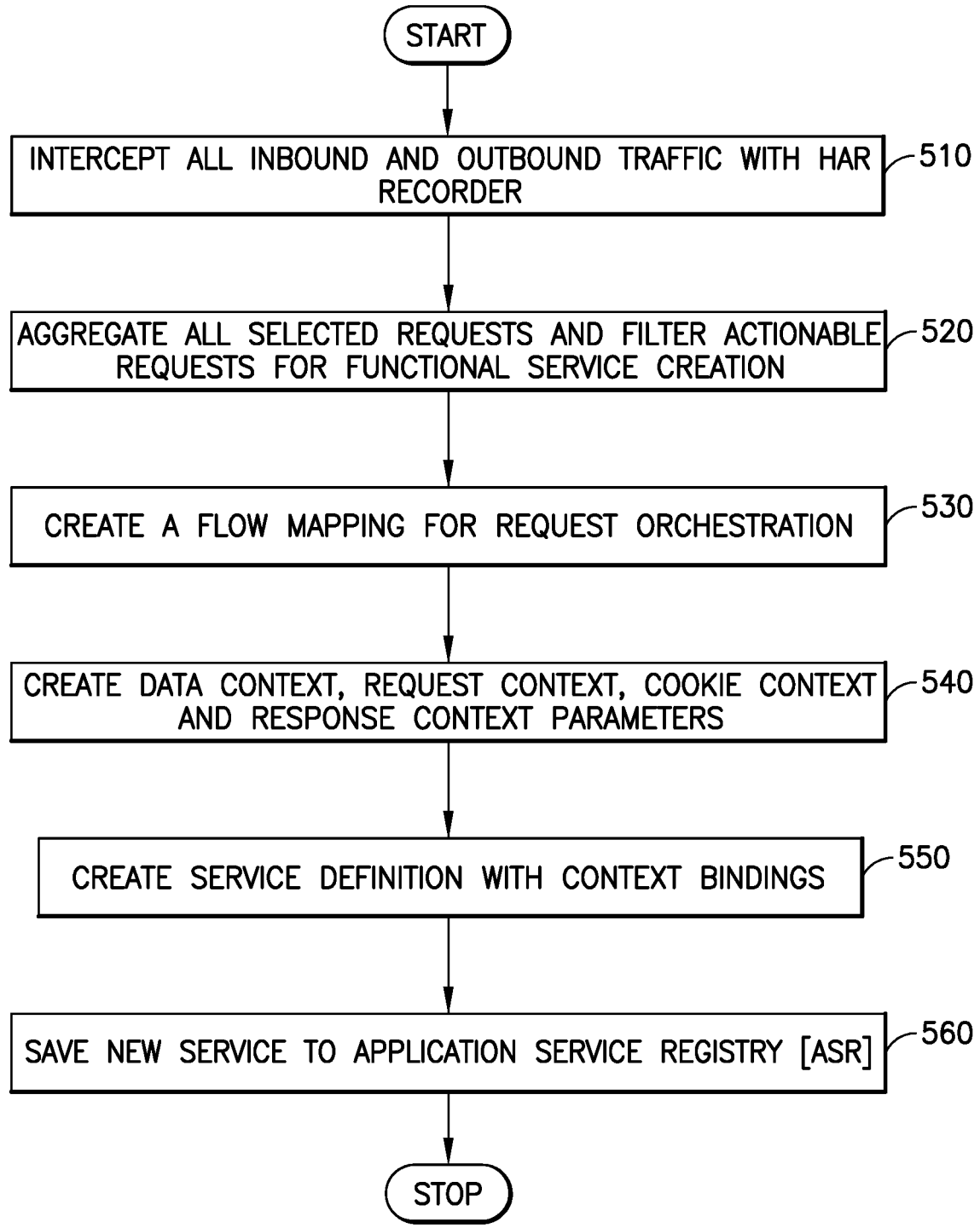
FIG. 5 is a flowchart for performing service generation using the subsystem of FIG. 4.

FIG. 5 depicts a process for performing service generation by the automation service platform. The test platform intercepts all inbound and outbound network traffic using the HAR recorder (510). The service generator (FIG. 4, 310), in conjunction with the service processing engine (FIG. 4, 315), aggregates the received requests and filters actionable requests to create functional services (520). A flow mapping is created for request orchestration, e.g., as discussed below with respect to FIG. 6 (530). Contextual information needed for the generated service to properly execute is produced, such as, for example, data context, request context, cookie context, and response context parameters (540). A service definition (e.g., a microservice) is created with the necessary context bindings (550). The service definition is saved to the application service registry (ASR) (560).

Figure 6:
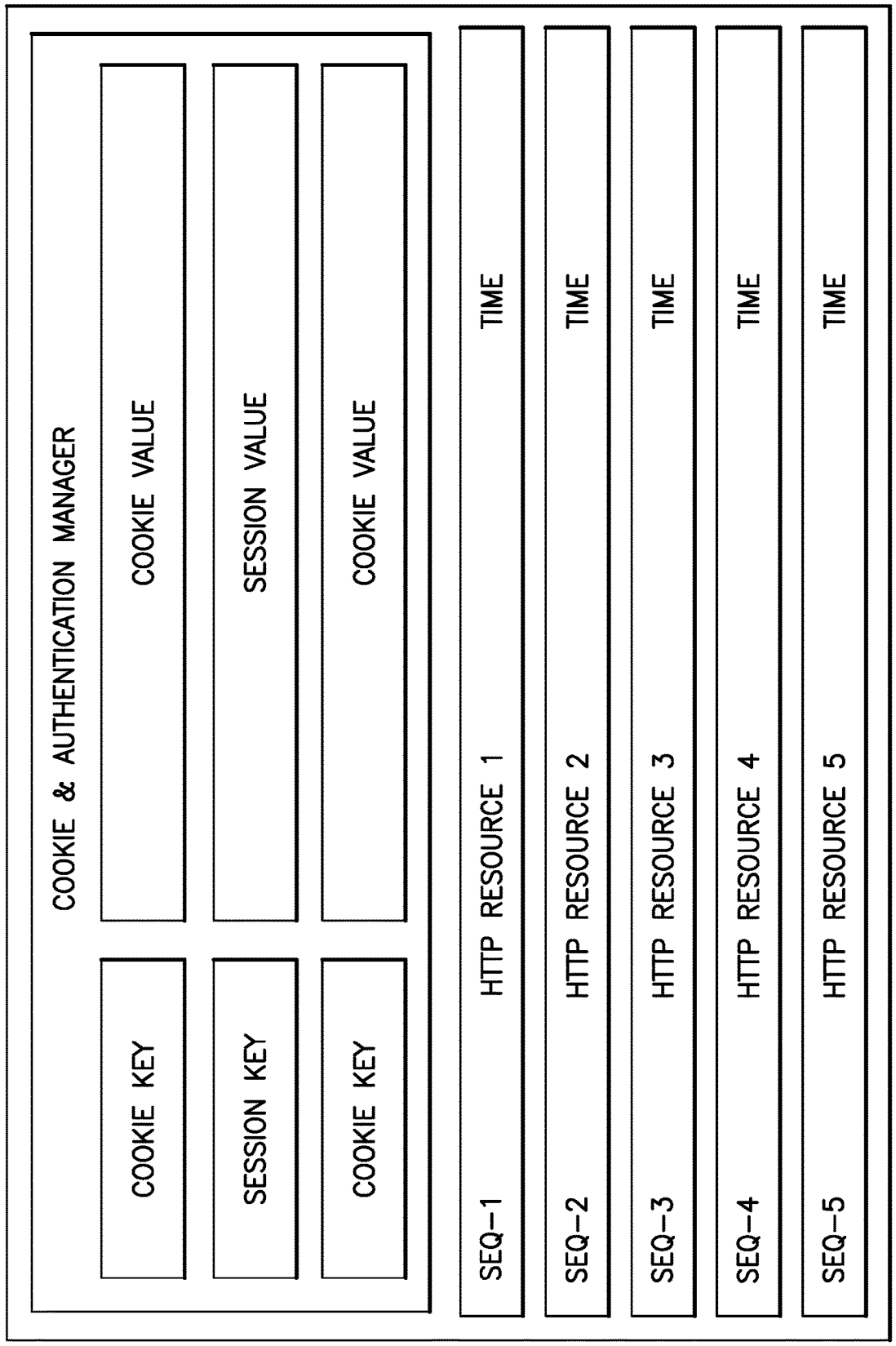
FIG. 6 shows a schematic representation of a service created by the subsystem of FIG. 4.

FIG. 6 shows a schematic representation of a service definition created by the service generation subsystem (see FIG. 4). The service may include a session key and cookie keys and their associated values. This information provides the necessary context to allow the generated service definition to accurately produce the network traffic for the associated functional element. The service also includes a sequence of HTTP requests with particular HTTP resources and the associated timing of such traffic.

Figure 7:
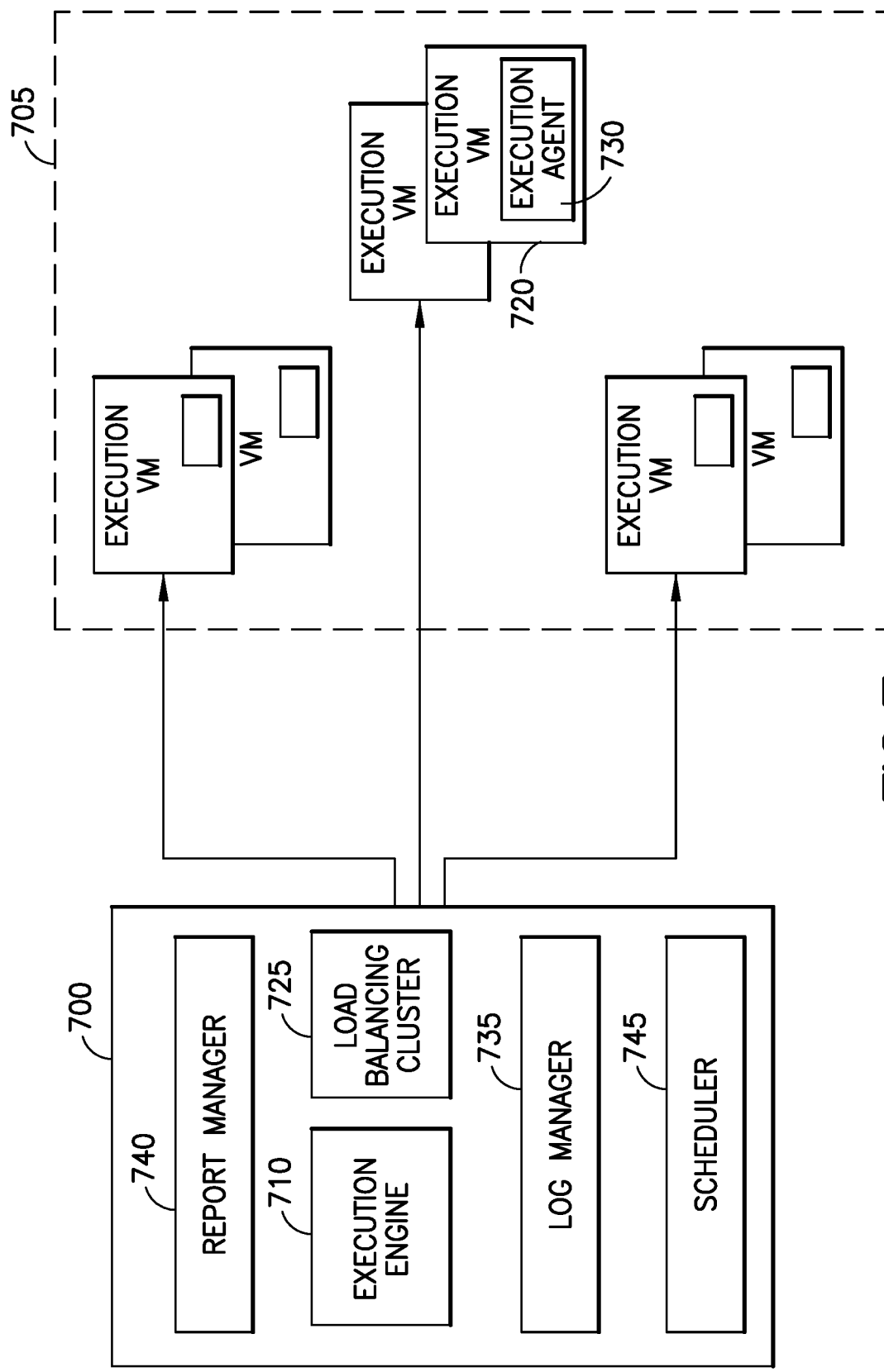
FIG. 7 is a block diagram of a subsystem for performing automated test execution in the automation service platform of FIG. 3.

FIG. 7 is a block diagram of a subsystem 700 for performing automation test execution by the automation service platform 100 in an execution environment 705. The subsystem 700, which corresponds to the execution manager (FIG. 3, 340) discussed above, includes an execution engine 710 which executes test scenarios created using the UI modeler (FIG. 3, 330). The execution engine 710, using service definitions stored in the application service registry (ASR) (FIG. 3, 325), produces network traffic corresponding to the functional elements of the test scenarios. The network traffic is sent to an array of execution virtual machines (VM) 720 to be executed. The network traffic sent to the array, which may be referred to as a quality assurance "farm" of execution VM 720, may be controlled by a load balancing cluster 725 to optimize execution efficiency and scalability and ensure efficient use of computing resources. Each execution VM 720 instance may include an execution agent 730 which controls the execution and communication between the execution VM 720 and the execution manager subsystem 700.

The execution environment 705 which holds the testbed setup, i.e., execution equipment, and environment configuration to run test scenarios may be, for example: a VM farm (as shown), execution clusters hosted inside an organization's firewall, or a public or private cloud farm. The test bed setup is configured to open communication ports with the automation service platform 100 that support inbound and outbound network traffic (e.g., HTTP traffic). An execution agent 730 is installed in every system, e.g., every execution VM 720 instance, at the operating system level to establish and synchronize information flow between runtime test environment, i.e., execution environment 705, and the execution engine 710.

The execution manager subsystem 700 also includes a log manager 735 to maintain logs for execution processes. The log manager is configured to trace errors and failures at the service level, application level, and network level, i.e., application integration level. In disclosed embodiments, on completion of each test execution, a report is sent to the report manager 740, which is configured to store and present report data relating to test execution in various forms. This arrangement allows the automation service platform 100 to validate and report issues from dynamic tests at any application level, such as component testing, module testing, integration testing, system testing, and user acceptance testing.

A scheduler, e.g., Jenkins or Quartz, may be used to trigger the test execution on the distributed execution VM 720. During runtime, the execution subsystem reads stored test scenarios, with their associated test flow metadata, environment configuration parameters, and test data, from the persistence layer (e.g., storage 350 or a separate storage/database which is not shown) and sends this information to the execution manager 710. The execution manager 710 is responsible for handling test execution lifecycle and test reporting. The execution engine 710 also handles authentication mechanisms for different applications under test (AUT). In disclosed embodiments, the execution engine is highly tolerant multi-threaded component which handles text execution and test flow.

Figure 8:
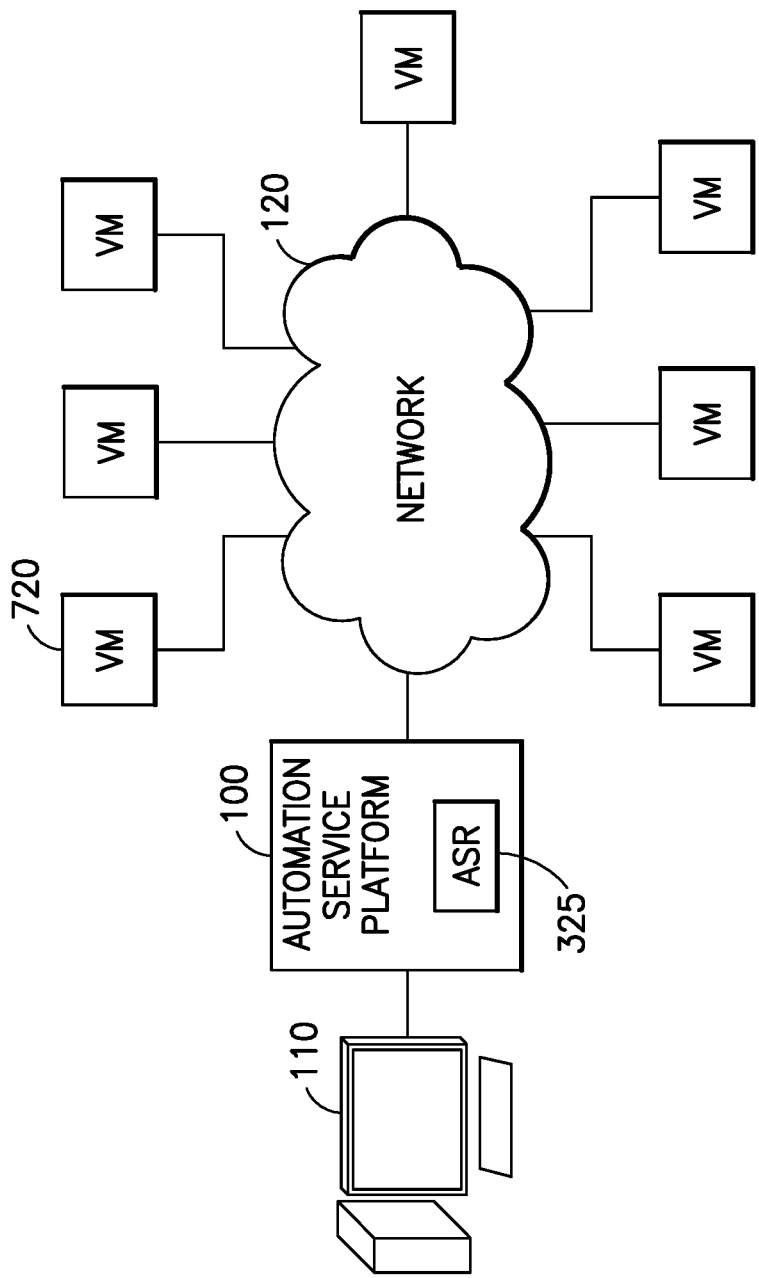
FIG. 8 is a block diagram of an automation service platform performing automated testing using a network of virtual machines.

FIG. 8 is a block diagram of the automation service platform 100 performing automated testing using a network of virtual machines 720. A user computer 110 is connected to the automation service platform 100 to provide a user interface for controlling the runtime testing. The diverse backend stacks, which were connected to the automation service platform during generation of the services stored in the application service registry (ASR) 325, are not needed in the runtime phase (i.e., the execution phase) of the automated testing. Rather, the testing may rely on services which have been previously generated and stored in the ASR 325. In disclosed embodiments, services generated by a particular automation service platform 100 may be stored in an ASR 325 and shared with other platforms for testing execution. Therefore, in disclosed embodiments, an automation service platform may include only the components necessary for test scenario design and test execution, i.e., the UI modeler (FIG. 3, 330) and the test execution subsystem (see FIG. 7). Alternatively, the automation service platform may include only the components necessary for runtime testing, as the test scenarios may be created separately and imported into the system. Thus, the service generation, test scenario definition, and test execution components of the automated service platform 100 may be implemented together in a single implementation or in various separate configurations.

Figure 9:
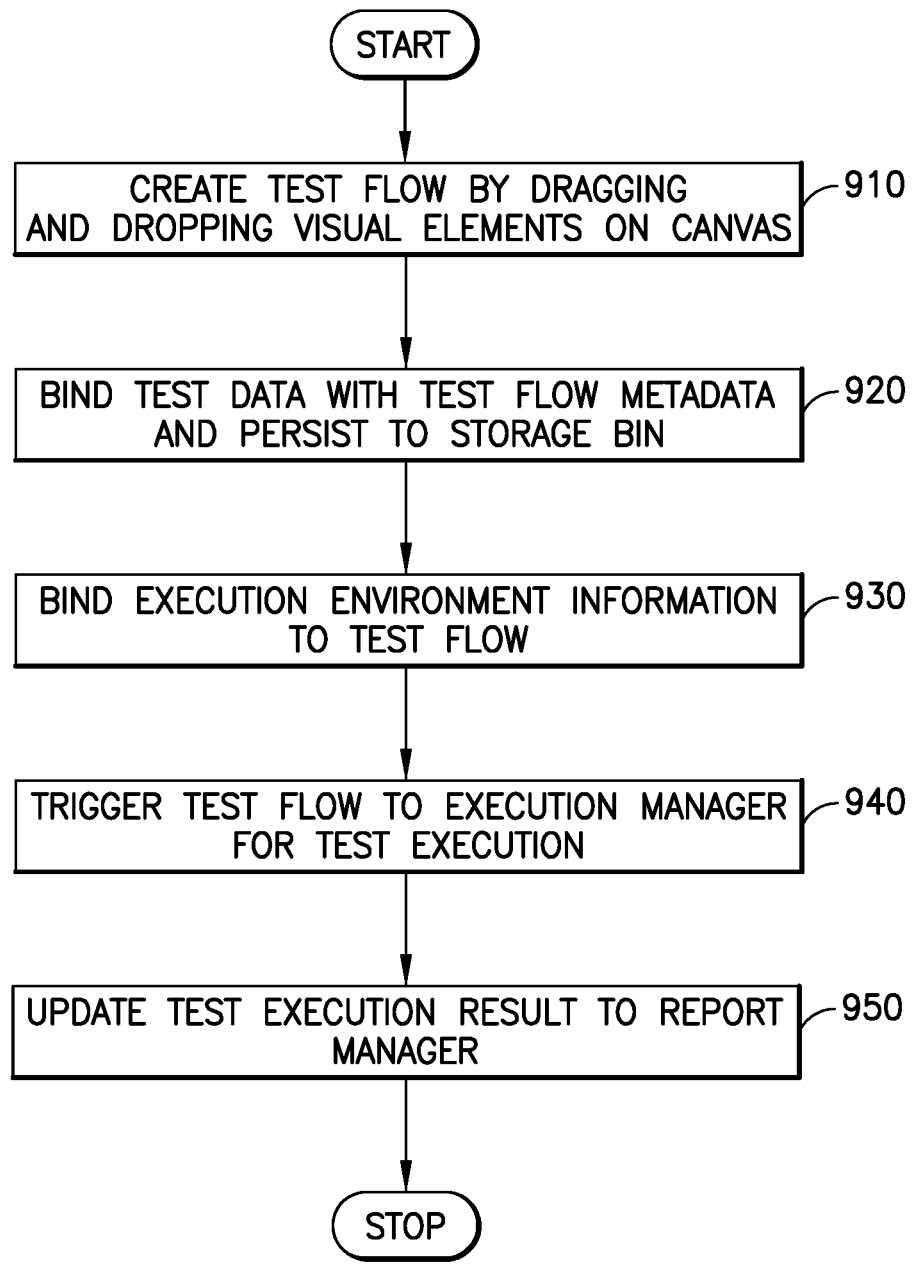
FIG. 9 is a flowchart for representing and executing a test scenario through a user interface.

FIG. 9 is a flowchart for representing and executing a test scenario through a user interface. As discussed above, a user may create a test flow, i.e., test scenario, using a user interface, e.g., the UI modeler (FIG. 3, 330) of the automated service platform 100. In disclosed embodiments, the user creates the test flow by dragging and dropping visual elements, i.e., graphical elements, onto a "canvas," which is a screen area (e.g., a window) which is designated to present a schematic (i.e., graphical) representation of the test flow (910). The UI modeler 330, in conjunction with components of the automated service platform 100 discussed above, binds test data (e.g., the input test data required for the functional element being executed) to the test flow and stores the result (920). The execution environment information is then bound to the test flow (930). The execution manager (FIG. 3, 340) performs test execution based on the test flow (940). The test execution result is output (i.e., "updated") to the report manager (FIG. 7, 740) (950).

Figure 10:
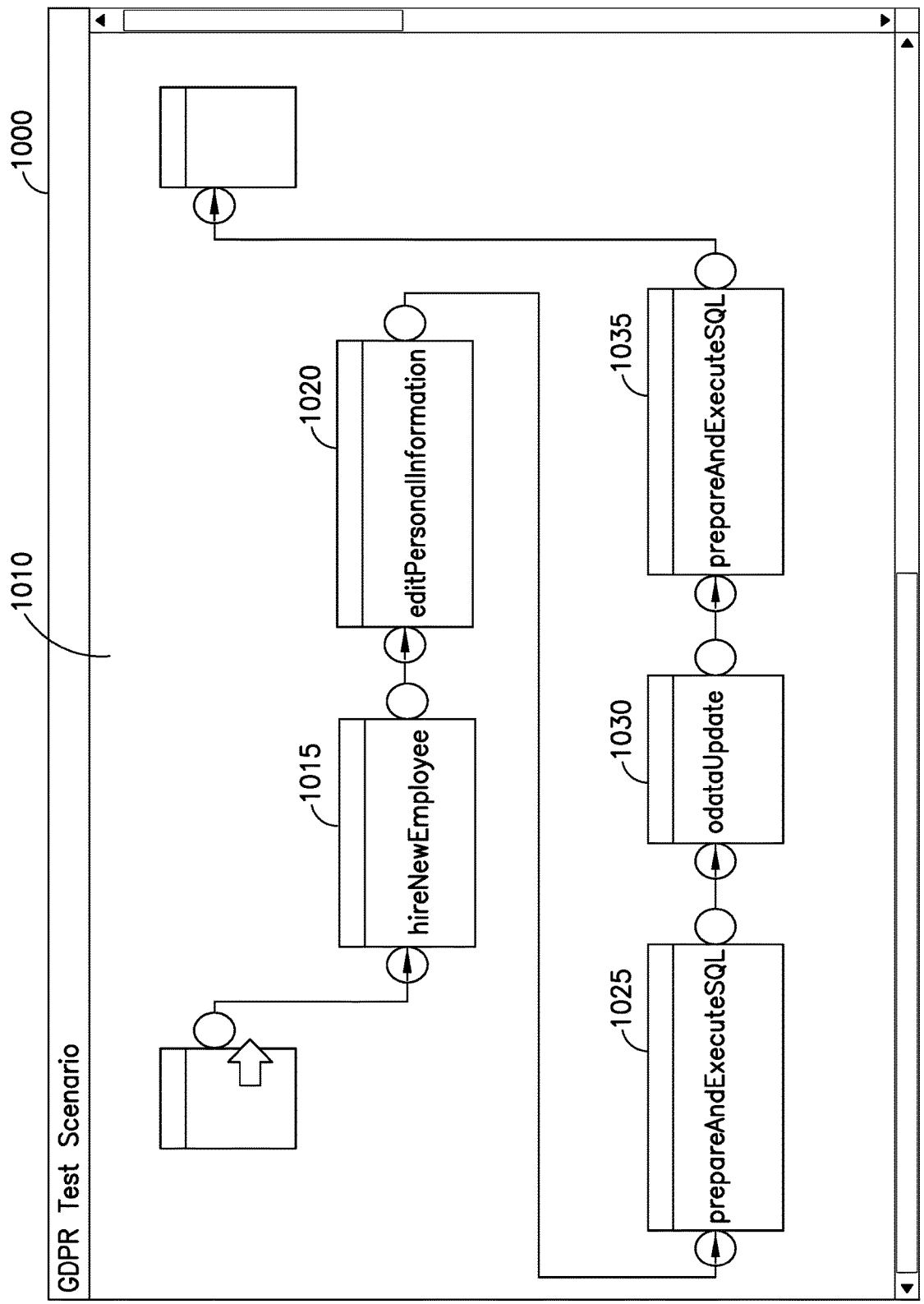
FIG. 10 depicts a user interface for creating a test scenario based on stored service definitions.

FIG. 10 depicts a user interface 1000 for creating a test scenario based on stored service definitions. The user creates the test flow by dragging and dropping visual elements, i.e., graphical elements, onto a canvas 1010, which is a screen area (e.g., a window) which is designated to present a schematic (i.e., graphical) representation of the test flow. The user interaction may include discovery and configuration of independent functional scenarios produced by the service generator (FIG. 3, 310) and creation of an end-to-end test scenario design using the user interface (UI) modeler (FIG. 3, 330) by dragging and dropping available functional services to generate metadata independent of test data and environment configuration. In this way, custom test scenarios can be created though the user interface design pallet with drag and drop features, where independent functions represented as nodes can be attached to an execution flow to represent the test scenario.

The example depicted in FIG. 10 relates to a scenario to test an automated process for verifying compliance with the European Union's (EU) General Data Protection Regulation (GDPR) by logging viewing of sensitive data. The test scenario includes a combination of user interface (UI), application program interface (API), and database services which were previously generated and which are stored in the ASR (FIG. 3, 325). First, there is a node 1015 for UI service associated with hiring a new employee in the EU. Then, there is a node 1020 for a UI service for viewing the personal information of another user. There is a node 1025 for a database service for verifying that read access information is logged. There is a node 1030 for an API service for updating compensation information. The last node 1035 of this example is a database service for verifying that the changed information is logged.

Figure 11:
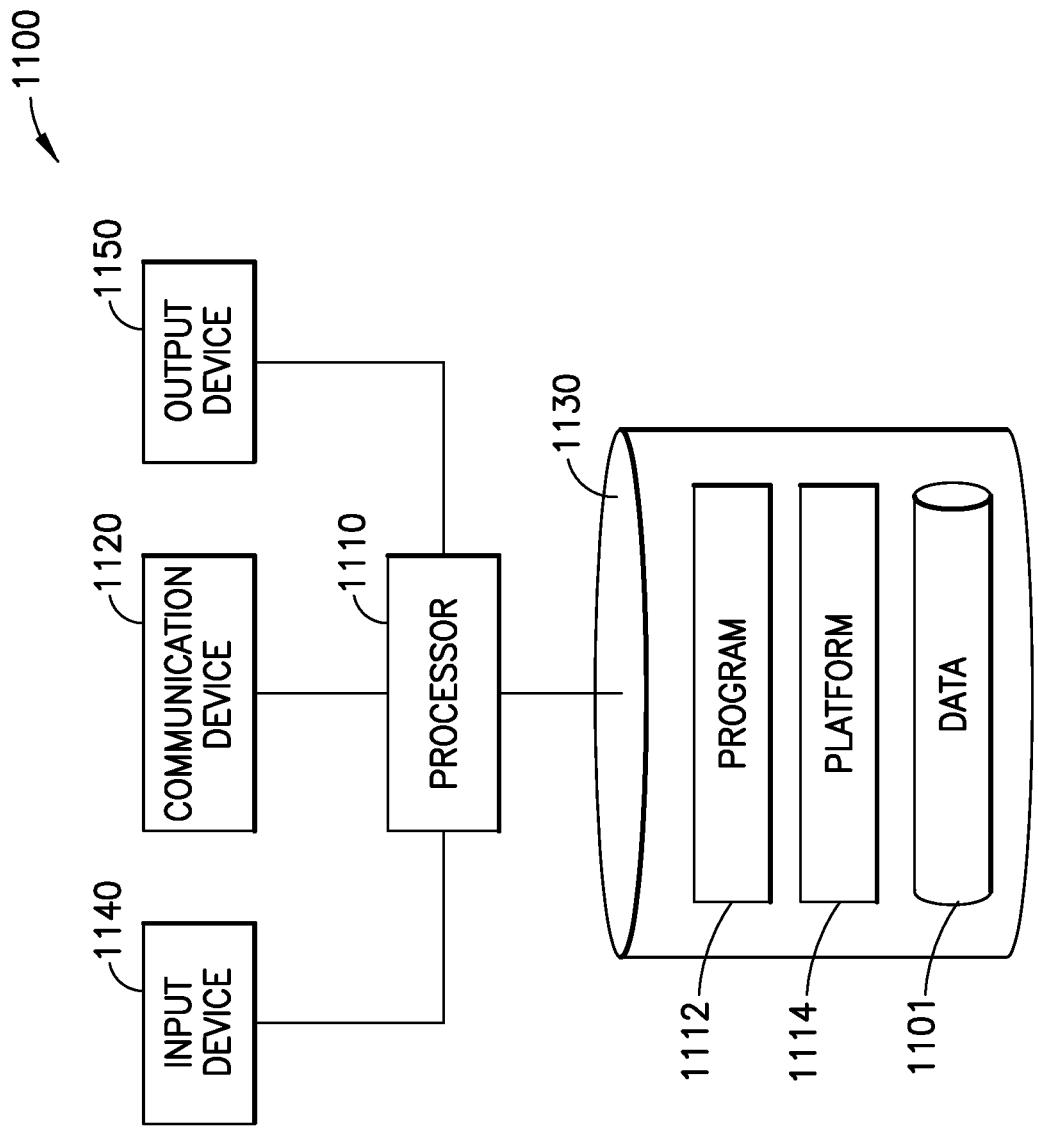
FIG. 11 is a block diagram of a system according to some embodiments.

FIG. 11 is a block diagram of apparatus 1100 according to some embodiments. Apparatus 1100 may comprise a general-purpose or special-purpose computing apparatus and may execute program code to perform any of the functions described herein. Apparatus 1100 may comprise an implementation of one or more elements of system 100. Apparatus 1100 may include additional elements which are not shown, according to some embodiments.

Apparatus 1100 includes processor 1110 operatively coupled to communication device 1120, data storage device/memory 1130, one or more input devices 1140, and one or more output devices 1150. Communication device 1120 may facilitate communication with external devices, such as an application server. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to manipulate graphical user interfaces and to input information into apparatus 1100. Output device(s) 1150 may comprise, for example, a display (e.g., a display screen) a speaker, and/or a printer.

Data storage device/memory 1130 may comprise any device, including combinations of magnetic storage devices (e.g., magnetic tape, hard disk drives and flash memory), optical storage devices, Read Only Memory (ROM) devices, Random Access Memory (RAM) etc.

The storage device 1130 stores a program 1112 and/or platform logic 1114 for controlling the processor 1110. The processor 1110 performs instructions of the programs 1112, 1114, and thereby operates in accordance with any of the embodiments described herein, including but not limited to the processes.

The programs 1112, 1114 may be stored in a compressed, uncompiled and/or encrypted format. The programs 1112, 1114 may furthermore include other program elements, such as an operating system, a database management system, and/or device drivers used by the processor 1110 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method of performing automated testing in a distributed enterprise software environment, the environment having a plurality of computer systems interconnected via a network, each of the computer systems executing software based on an application stack, the computer systems being connected via the network to a service platform, the method comprising:

implementing the service platform in the distributed enterprise software environment, the distributed enterprise software environment having two or more heterogeneous application stacks, the service platform being agnostic of each application stack type among the two or more heterogeneous application stacks;

executing a function directed to a target system of the computer systems, the function resulting in network requests being sent from the service platform to the target system;

recording in a Hypertext Transfer Protocol (HTTP) archive format, at the service platform, the network requests produced by the executed function, the network requests being independent of a target system application stack, the target system application stack being among the two or more heterogeneous application stacks;

generating a service corresponding to the function based on the recorded network requests;

processing a user input comprising a drag and drop arrangement of graphical representations of two or more functional elements in a particular order, based on the user input, and received via a graphical user interface modeler to generate a test scenario which uses the generated service corresponding to the function, the test scenario comprising sequences of operations, wherein the two or more functional elements correspond to service definitions stored in a registry;

executing the test scenario comprising the two or more functional elements in the particular order, wherein the test scenario uses the generated service to produce test requests; and communicating the test requests to one or more of the plurality of computer systems independent of the each application stack type.

2. The method of claim 1, wherein the generating of the service comprises:

extracting network requests relating to the function from the recorded network requests;

determining a flow mapping for the function, the flow mapping including a sequence of requests based on the extracted network requests;

determining context parameters for the function based on the extracted network requests; and creating a service definition based on the flow mapping and the context parameters.

3. The method of claim 2, wherein the context parameters comprise at least one of cookie and session parameters.

4. The method of claim 2, wherein the flow mapping comprises timing parameters for the sequence of requests.

5. The method of claim 2, further comprising storing the service definition in the registry.

6. The method of claim 1, wherein the executing of the test scenario comprises sending the test requests to a test environment comprising a plurality of virtual machines.

7. The method of claim 1, wherein the executing of the test scenario comprises binding test input data to the functional elements.

8. The method of claim 1, wherein testing of the two or more heterogenous stacks is performed during the execution of the test scenario.

9. An automation service platform for performing automated testing in a distributed enterprise software environment, the environment having a plurality of computer systems interconnected via a network, each of the computer systems executing software based on an application stack, the computer systems being connected via the network to the service platform, the service platform comprising a processor and memory having code to cause the processor to perform:

implementing the service platform in the distributed enterprise software environment, the distributed enterprise software environment having two or more heterogeneous application stacks, the service platform being agnostic of each application stack type among the two or more heterogeneous application stacks;

executing a function directed to a target system of the computer systems, the function resulting in network requests being sent from the service platform to the target system;

recording in a Hypertext Transfer Protocol (HTTP) archive format, at the service platform, the network requests produced by the executed function, the network requests being independent of a target system application stack, the target system application stack being among the two or more heterogeneous application stacks;

generating a service corresponding to the function based on the recorded network requests;

processing a user input comprising a drag and drop arrangement of graphical representations of two or more functional elements in a particular order, based on the user input, and received via a graphical user interface modeler to generate a test scenario which uses the generated service corresponding to the function, the test scenario comprising sequences of operations, wherein the two or more functional elements correspond to service definitions stored in a registry;

executing the test scenario comprising the two or more functional elements in the particular order, wherein the test scenario uses the generated service to produce test requests; and communicating the test requests to one or more of the plurality of computer systems independent of the each application stack type.

10. The service platform of claim 9, wherein the generating of the service comprises:

extracting network requests relating to the function from the recorded network requests;

determining a flow mapping for the function, the flow mapping including a sequence of requests based on the extracted network requests;

determining context parameters for the function based on the extracted network requests; and creating a service definition based on the flow mapping and the context parameters.

11. The service platform of claim 10, wherein the context parameters comprise at least one of cookie and session parameters.

12. The service platform of claim 10, wherein the flow mapping comprises timing parameters for the sequence of requests.

13. The service platform of claim 10, further comprising storing the service definition in the registry.

14. The service platform of claim 9, wherein the executing of the test scenario comprises sending the test requests to a test environment comprising a plurality of virtual machines.

15. A non-transitory computer-readable medium storing program instructions executed by at least one processor of a computer system having memory, the medium comprising instructions for causing the at least one processor to perform a method of automated testing in a distributed enterprise software environment, the environment having a plurality of computer systems interconnected via a network, each of the computer systems executing software based on an application stack, the computer systems being connected via the network to a service platform, the method comprising:
- implementing the service platform in the distributed enterprise software environment, the distributed enterprise software environment having two or more heterogeneous application stacks, the service platform being agnostic of each application stack type among the two or more heterogeneous application stacks;
- executing a function directed to a target system of the computer systems, the function resulting in network requests being sent from the service platform to the target system;
- recording in a Hypertext Transfer Protocol (HTTP) archive format, at the service platform, the network requests produced by the executed function, the network requests being independent of a target system application stack, the target system application stack being among the two or more heterogeneous application stacks;
- generating a service corresponding to the function based on the recorded network requests;
- processing a user input comprising a drag and drop arrangement of graphical representations of two or more functional elements in a particular order, based on the user input, and received via a graphical user interface modeler to generate a test scenario which uses the generated service corresponding to the function, the test scenario comprising sequences of operations, wherein the two or more functional elements correspond to service definitions stored in a registry;
- executing the test scenario comprising the two or more functional elements in the particular order, wherein the test scenario uses the generated service to produce test requests; and
- communicating the test requests to one or more of the plurality of computer systems independent of the each application stack type.

16. The non-transitory computer-readable medium of claim 15, wherein the generating of the service comprises:
- extracting network requests relating to the function from the recorded network requests;
- determining a flow mapping for the function, the flow mapping including a sequence of requests based on the extracted network requests;
- determining context parameters for the function based on the extracted network requests; and
- creating a service definition based on the flow mapping and the context parameters.

17. The non-transitory computer-readable medium of claim 16, wherein the method further comprises storing the service definition in the registry.

* * * * *